United States Patent [19]

Heutschi

[11] Patent Number: 5,221,393
[45] Date of Patent: Jun. 22, 1993

[54] TAPE FASTENER AND FASTENING METHOD EMPLOYING SAME

[75] Inventor: Urs Heutschi, Müllheim, Switzerland
[73] Assignee: Feramatic AG, Weinfelden, Switzerland
[21] Appl. No.: 745,280
[22] Filed: Aug. 14, 1991
[30] Foreign Application Priority Data
  Oct. 2, 1990 [CH] Switzerland ............ 3157/90
[51] Int. Cl.⁵ .................................... B32B 31/00
[52] U.S. Cl. ................................. 156/191; 24/16 PB; 24/304; 24/572; 156/152; 156/306.3; 156/324.4; 156/344; 403/2; 428/33; 428/99; 428/223; 428/349; 428/906
[58] Field of Search ............... 156/324.4, 306.3, 152, 156/344, 191; 428/33, 906, 349, 99, 223; 24/16 PB, 304, 572; 403/2

[56] References Cited

U.S. PATENT DOCUMENTS

| | | | |
|---|---|---|---|
| 2,053,820 | 9/1936 | Fleischer | 428/99 |
| 3,176,364 | 4/1965 | Dritz | 24/304 |
| 3,196,034 | 7/1965 | Pandolfo | 428/906 |
| 3,428,516 | 2/1969 | Reid et al. | |
| 3,491,935 | 1/1970 | Trotter et al. | 156/306.3 |
| 3,592,340 | 7/1971 | Hoey | 428/906 |
| 4,795,105 | 1/1989 | Frei | |

FOREIGN PATENT DOCUMENTS 0280949 3/1990 European Pat. Off. .
2126188 7/1984 United Kingdom .

Primary Examiner—John J. Gallagher
Attorney, Agent, or Firm—Walter C. Farley

[57] ABSTRACT

A winding tape for winding up printed products with a fastener having two fastening parts is described, one part of the fastener being the tape-like material and being made from a first polymer of a material pair and the other part of the fastener is an end piece on the tape-like material and at least partly is made from a second polymer of the material pair, the first polymer being chosen from among polyesters, polyamides, polyimides, polyterephthalates and polycarbonates and the second polymer is a hot-melt adhesive based on polyamide-6, polyamide copolymers, polyolefins or polyvinyl alcohol and has at one end a tape-like support material onto which is drawn a hot-melt adhesive film of the second polymer, which is heated for joining together the tape and the tape end and is pressed onto the winding tape.

12 Claims, 2 Drawing Sheets

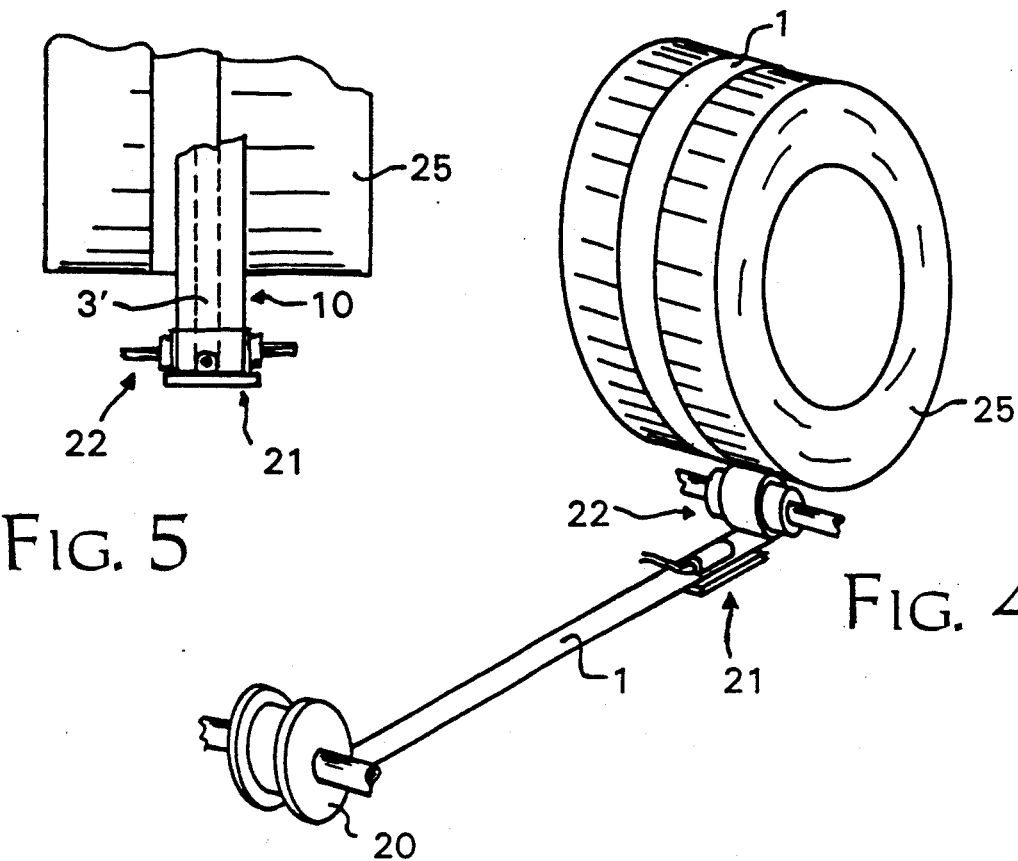
FIG. 5
FIG. 4
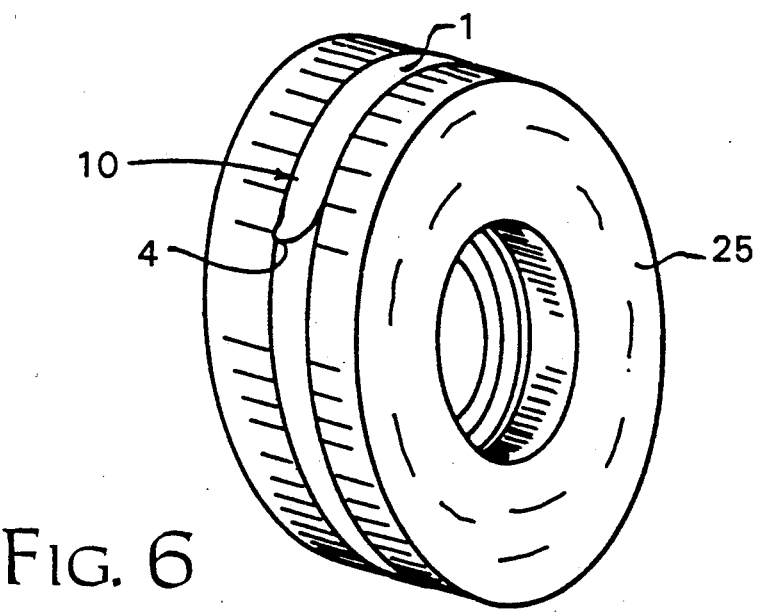
FIG. 6

TAPE FASTENER AND FASTENING METHOD EMPLOYING SAME

FIELD OF THE INVENTION

This invention relates to a tape used for securing wound-up printed products, which has an end portion fastenable to any other portion of the same tape or of another tape of the same type, wherein the fastening can be undone and redone a random number of times.

BACKGROUND OF THE INVENTION

A winding tape used for winding- up and securing rolls of printed products is wound up together with the printed products and further wound at least once around the finished, wound-up packet (roll) of printed products and fastened to itself. Generally speaking, the winding tape, as with other fastening tapes which are fastened around any article, needs to be fastened to itself. Usually, such fastening tapes are destroyed when they are removed from the article. If for any reason a winding tape or a fastening tape is to be used in unshortened form several times, it must be possible to open the fastening without destroying the tape. Such a fastening function is usually realized by mechanical fastening or locking systems with self-closures (burr strips, ratchets) or frictional engagement (squeezing or clamping devices), which can be opened and closed repeatedly a random number of times, or with cohesively acting joining means (glue), which in certain circumstances can be separated again, although there are limits with respect to such cohesive means. The free selection of such means for fastening the tape is usually limited by the intended application. Mechanical fastenings require more space than separable cohesive fastenings, but are usually stronger than the latter.

Winding and fastening tapes are tensioned longitudinally, i.e., in the direction of the tape length. The tape and fastening means must both be able to withstand this tension. Other types of loading and stressing only have a minor significance. A tape fastener, which is adequately tensionable in the direction of the tape length, fulfills its function even if its holding forces in other directions are smaller. The fact of smaller holding forces in some directions can even be advantageous for opening the fastening. If a fastening based on adhesive holding forces is given the correct construction, it can fulfill this requirement. If such a fastening furthermore is to be re-usable a random number of times and if an end portion of the tape is to be fastenable to any other portion of the tape, then several measures must be appropriately interlinked. One vital measure is to maintain the adhesive action over a long period of use.

SUMMARY OF THE INVENTION

Briefly described, the invention comprises a fastening tape made of a first polymer having a softening temperature and an end fastener with a coating of a second polymer having a lower softening temperature. When the tape is wrapped aroung a roll of products, the second polymer is heated to its softening temperature and pressed against any location on the tape, forming a releasable surface connection.

In conjunction with the present invention, the term "adhesion" is used for the sticking together of two surfaces which are not actually glued together. The two surfaces need to be made from suitable materials in such a way that their pairing results in the desired adhesion. Preferably, one of the surfaces is constituted by one surface of the fastening tape itself, while the adhesion partner with the other surface can be fixed to one end piece of the tape or to an appropriate support constituting an end portion to the tape. The fastening action is produced by positioning the two surfaces against each other and then applying pressure and/or (preferably) heat.

BRIEF DESCRIPTION OF THE DRAWINGS

The following drawings show an exemplary application of the winding tape with fastening means according to the invention as a winding tape for winding printed products delivered in a scale formation and stored on a reel.

FIG. 4 is a perspective view of a roll of printed products being wound on a reel with the help of a winding tape and with a heating and pressing device;

FIG. 5 is a partial side elevation showing a detail from FIG. 4 viewed in the direction of the tape movement; and FIG. 6 is a perspective view of a wound roll with the fastened tape.

DESCRIPTION OF THE PREFERRED EMBODIMENTS

Figure 1:
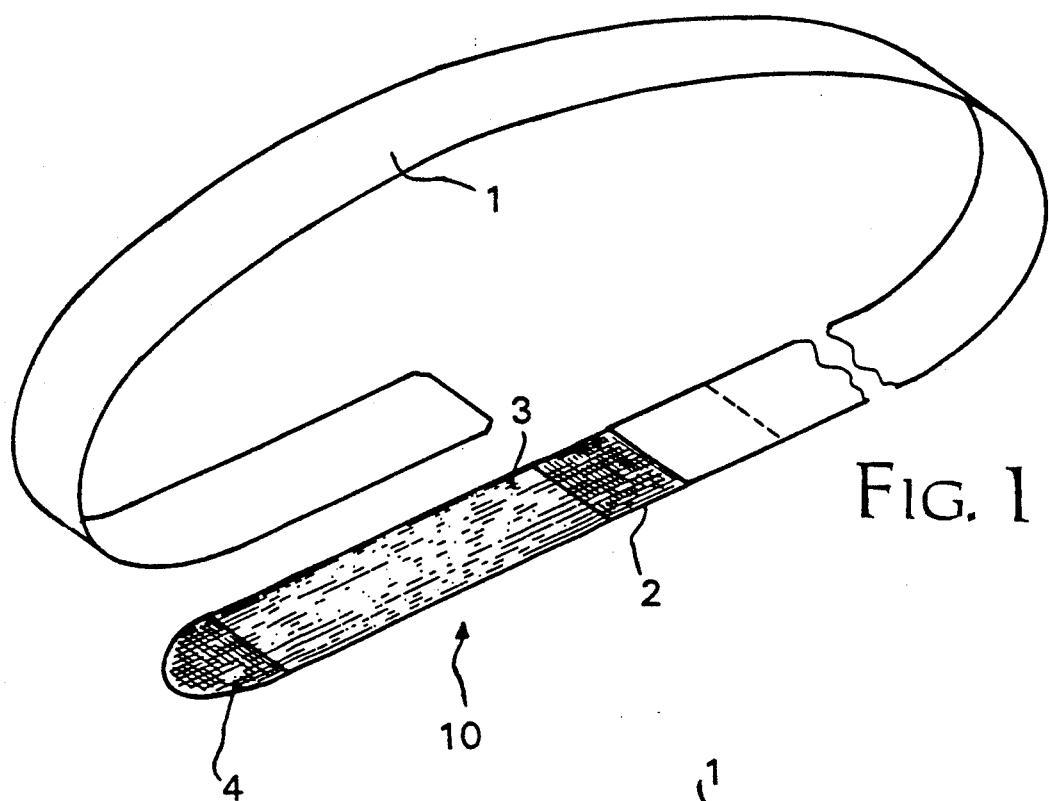
FIG. 1 is a perspective view of a fastening tape, apart from the object to be held, showing the fastening between the 10 end piece of the tape and any other portion of the tape, the attachment not having been completed.

The preferred, repeatably joinable and separable fastening comprises two materials (material pairing), whose surfaces can under certain conditions be made to adhere to each other, so that they stick to each other when pressure or heat is applied. The first one of the two materials constituting the fastening is preferably the material of the tape itself. The second one of the two materials is preferably fixed either on an end portion of the tape or on a support fixed to the end of the tape. The second material must in both cases be connected to the tape material or to the support in such a way that the connection can not be broken except by destroying the tape as it is. For this reason, the surface of the tape in the area of its connection with the second material is roughened so that the second material can be firmly anchored on it as if glued to it. If a support is used, it is preferably given a tape-like form with a similar thickness and width as the tape itself. The support must also be adequately tension-proof and able to withstand the frequent plucking and tugging of many opening operations. In the present example, the support is a cloth tape or belt to which the second material is applied. However, paper-based materials could also be used as materials for the support. The desired separable fastening is constituted by two areas each of one of the two materials either located on one tape or on two different tapes, or more precisely by two surfaces each of one of the two materials separably adhering together.

Material pairs (first and second material) can be chosen as a first polymer from the polymer groups including polyesters, polyamides, polyimides, polyterephthalates, polycarbonates and polyolefins and as a second polymer from the group of hot-melt adhesives based on polyamide-6, polyamide copolymers, polyesters, polyolefins and polyvinyl alcohol.

In a first example the winding tape consists of polyamide-6 and has a smooth surface (obtainable from Leder Beltech AG, Rapperswil, Switzerland). The fastening part (end piece) consists of a support of a nylon fabric web or a flax fabric web (obtainable from Schweiz. Seidengazefabrik, 9425 Thal, Switzerland), which is coated with a polyamide copolymer-based hot-melt adhesive film (obtainable as Griltex 11 from Ems Chemie, Domat-Ems, Switzerland) with a more or less smooth, non-tacky surface. For fastening the end piece to the tape the surfaces of the material pair polyamide-6/polyamide copolymer are pressed onto one another and heated until the softening point (adhesion temperature) of the hot-melt adhesive film is reached and the latter clings smoothly to the tape. The temperature is then allowed to drop again. The cohesion in the adhesive film increases again until it exceeds the adhesion between the two materials. The thus joined surfaces, which are not conventionally bonded together, adhere surprisingly well and in the direction of the tape length the resistance to tensile forces is good. However, the two surfaces can easily be separated by lifting the support off the tape (peeling), i.e. by means of a force acting at an angle to the tensile force. The separation is effected without leaving residues on either of the surfaces. Thus, such a fastening of a winding tape can even be opened by hand. The refastening takes place under renewed pressure and heat action. The film with the hot-melt adhesive can also be warmed before the pressing together of the two parts.

For the described fastening, on the one hand particular use is made of the inadequate adhesion of the hot-melt adhesive on its adhesion partner (tape surface) for the separable fastening and on the other hand particular use is made of the good adhesion between the adhesive and the support material for fixing the adhesive film to the support. If the adhesive film is fixed to the end portion of the tape itself use is made in the same way of the inadequate adhesion of the adhesive to a smooth tape surface (for the separable fastening) and of its good adhesion to a rough tape surface (for fixing the adhesive film to the tape). A support is used if the consistency of the material of neither of the two adhesion partners is suitable for use as a release tongue. The inactivity of the surface of the hot-melt adhesive in the unheated state prevents any adhesion of foreign particles thus counteracting any permanent dirtying when the fastening is open. Dust and dirt particles can be wiped off easily before fastening. Such a fastening can be used over many closing/opening cycles.

In a second example the tape is made from polyethylene terephthalate (obtainable from Hoechst, Wiesbaden, Germany) and has a smooth surface. The fastening part (end piece) consists of a support of a mixed fabric web with polypropylene (obtainable e.g. from Meister & Cie, Hasle-Ruegsau, Switzerland), which is coated with a polyurethane-based hot-melt adhesive film (obtainable from Guttacoll GmbH, Buxtehude, Germany) with a more or less smooth, non-tacky surface. The adhesive film can also be fixed on the tape itself instead of on a support, if for anchoring purposes the tape surface is roughened in the corresponding area, so that the hot-melt adhesive is firmly glued to the tape on one side and on the other side can be easily fastened, separated and refastened repeatedly to and from the same tape. This is achieved with the same material pair. For fastening, the surfaces of the material pair polyethylene terephthalate/polyurethane are pressed together and heated until the softening point (adhesion temperature) of the hot melt adhesive film is reached and the latter firmly engages on the tape. The temperature is then allowed to drop again.

In a third example the tape is made from polyamide-G and has a smooth surface (obtainable from Leder Beltech, Rapperswil, Switzerland). The support at the end of the tape is made from a polyester fabric web (obtainable from Schweiz. Seidengazefabrik, 9425 Thal, Switzerland) and is coated with a polyolefin-based hot-melt adhesive film (obtainable as Polyolefin type P80 from Guttacoll GmbH, Buxtehude, Germany) which has a more or less smooth, non-tacky surface. For the fastening, the surfaces of the polyamide/polyolefin material pair are pressed onto one another and heated until the softening point (adhesion temperature) of the hot-melt adhesive film is reached and the latter engages firmly on the tape. The temperature is then allowed to drop again.

In general terms, materials from the aforementioned groups of polyesters, polyamides, polyimides, polycarbonates, polyterephthalates and polyolefins suitable for winding or fastening tapes due to their toughness are paired with materials from the group of polyamides, polyamide copolymers, polyolefins, polyesters, polyvinyl alcohols and polyurethanes suitable as hot-melt adhesives due to the special characteristics of their liquid/solid transitions. The tension resistance of fastenings between such material pairs is completely adequate for their exemplary application for the fastening of winding tapes for winding up and securing rolls of printed products and their manipulatability is excellent.

Figure 3:
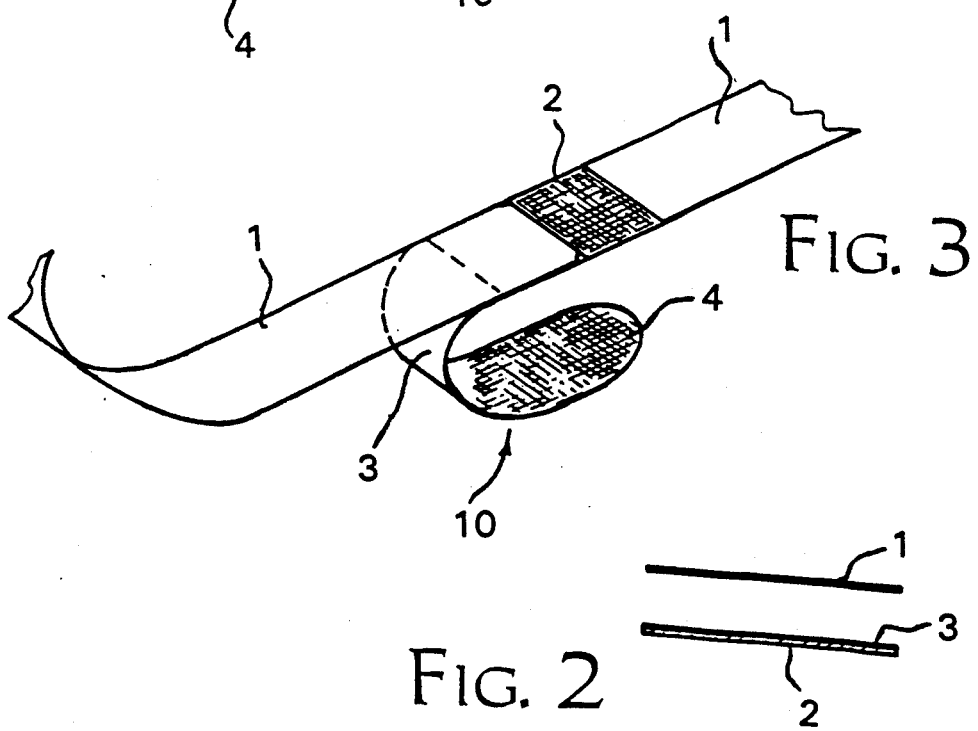
FIG. 3 is a perspective view of fastened portions showing the fastening just being opened.
Figure 2:
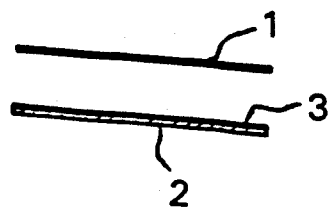
FIG. 2 is a partial side elevation in section through an open fastening, showing the layers of the different materials, namely tape material (first material), support material and second material (hot-melt film)

Referring now to the Figures, FIG. 1 shows an elongated strip of winding tape 1 of any chosen length, to whose one end is fitted as an end piece 10 a support 2. The other end of the tape, and more generally any portion of the tape, is positioned and pressed against this end piece. The end piece 10 consists of the support 2, in this case a matching cloth tape, to which a layer 3 of the second material (hot-melt adhesive) is applied over a suitable length. FIG. 2 shows these three layers in section. The end piece has a release tongue 4 for grasping purposes so that, as shown in FIG. 3, the fastening can be reopened with a simple opening movement.

Obviously two or more winding tapes of the same type can be inter-connected by fastening them together in the same way in order to get a much longer tape or to lengthen only one portion. Wherever a tape is tensioned in the direction of its length only, a fastening according to the invention can be used.

FIG. 4 shows the use of a winding tape 1 with fastening means according to the invention on a roll 25 of wound-up printed products The winding tape 1 is wound up together with the printed products and then fastened to itself on the surface of the roll for securing the printed products in the roll. The winding tape 1 is unwound from a tape reel 20. The tape, according to the invention, is provided with an end piece 10, which, in the state of the winding process as shown in FIG. 4, is still rolled up on the reel. The tape runs through a heating station 21, loops round a pressing roller 22 and passes onto the roll 25, whose inlet for the supply of printed products is not shown. When the tape reel 20 becomes empty, then the end piece 10 with the layer 3 of the second material (hot-melt adhesive) on its one surface which is to face the roll (lower surface in the Figure) is unwound from it. It is heated in the heating means (without pressing) to above the softening point (adhesion temperature) and is then pressed by the pressing roller onto the outermost tape layer on the roll. If the tape length is to be extended, it can be brought together at this point with a further tape made from the same material.

FIG. 5 shows a preferred procedure for heating the layer 3 of the second material (hot-melt adhesive) in which this layer is not heated over its full width, but on a more narrow trace 3'. Even if an end piece with a heated trace 3' is pressed onto the tape, lightly displaced sideways as shown in the Figure, it will still not stick to the printed products. FIG. 6 shows a roll with a winding tape with a fastening means according to the invention, where the release tongue 4 is particularly visible. This tongue is used for the automatic tearing open of the fastening such as by magnetic force. For this purpose, a ferromagnetic material is incorporated in the support material enabling the tongue to be engaged by a magnet in order to open the fastening. After opening the tape is again wound onto a tape supply reel 20 and the printed products are simultaneously unwound. This process can be repeated with the same tape many times.

The presently discussed exemplary application relates to a roll of wound-up printed products, which has a diameter of up to 2 meters and the winding tape is approximately 5 mm wide. The length of the end piece is between 10 and 50 cm, so that it has an adhesion surface on the order of 20 cm². This is a typical industrial process, which can also be performed in different ways.

For example, the fastening of the winding tapes for rolls of printed products has been realized with the novel burr fastener, as described in the U.S. Pat. No. 5,105,520. There the problems associated with the fastening of such rolls are described also. The tape with fastening according to the present invention is less expensive than the burr fastener, can be handled (e.g., transported) better from a mechanical point of view and has a longer life than the burr fastener, which in time loses tension and is increasingly damaged. However, the burr fastener requires no special fastening mechanism. However, due to a necessary support tape the end piece of the tape with burr fastener is somewhat thicker than the rest of the tape, whereas the tape with fastening according to the invention has a substantially constant thickness over its length, which facilitates tape transport. In addition, the fastening according to the invention is virtually as good as new for each further use.

I claim:

1. A method for mechanically fastening and unfastening a winding tape on a roll of printed products comprising the steps of
    forming an elongated strip of tape having a predetermined width from a first polymer having a first softening temperature,
    forming on an end portion of said strip of tape an attachment coating of a second polymer having a second softening temperature lower than the first softening temperature,
    winding the tap and printed products on a reel with an outer portion of the tape including said end portion circumferentially surrounding the wound products,
    heating the second polymer on said end portion to said second softening temperature,
    pressing said heated polymer against any exposed surface of said strip of tape and allowing the second polymer to cool to fasten the end piece of the tape to a part of the tape located on the circumference of the roll, and
    subsequently unfastening the cold end piece by peeling off the tape by pulling it at an angel generally perpendicular to the direction of tape elongation.

2. The method according to claim 1 and including, during the heating of the second polymer, heating a surface which is substantially symmetrical to a longitudinal center line of the tape but narrower than the tape width.

3. A method according to claim 2 wherein the end piece includes a ferromagnetic material and wherein peeling off the end piece includes imposing a magnetic force on the ferromagnetic material contained in the end piece.

4. A winding tape for winding-up and securing rolls of printed products comprising the combination of
    elongated strip of tape made of a first polymer having a first softening temperature; and
    an end piece fixedly attached to an end portion of said strip of tape, said end piece having a portion on one surface thereof including a second polymer having a second softening temperature lower than said first softening temperature,
    said first and second polymers forming a releasable surface connection when said second polymer is heated to said second softening temperature and pressed against any location on said elongated strip of tape.

5. A winding tape according to claim 4 wherein said first polymer is selected from the group consisting of polyesters, polyamides, polyimides, polyterephthalates, polycarbonates and polyolefins and said second polymer is a hot-melt adhesive containing polyamide-6, polyamide copolymers, polyester, polyolefins or polyvinyl alcohol.

6. A winding tape according to claim 4 wherein said end piece comprises a support fixed to one end of said strip of tape and a coating of said second polymer on an exposed surface of said support.

7. A winding tape according to claim 5 wherein said end piece comprises a coating of said second polymer on one surface of said end portion of said strip of tape.

8. A winding tape according to claim 7 wherein one surface of said end portion is roughened for a firm connection with the hot-melt adhesive film.

9. A winding tape according to claim 5 wherein said end piece is a cloth support with an applied film of hot-melt adhesive.

10. A winding tape according to claim 5 wherein said end piece has substantially the same width and the same thickness as said strip of tape.

11. A winding tape according to claim 5 wherein said end piece contains a ferromagnetic material.

12. A winding tape for winding-up and securing rolls of printed products comprising the combination of
    a plurality of elongated strips of tape each made of a first polymer having a first softening temperature; and
    a plurality of end pieces each fixedly attached to an end portion of one of said strips of tape, each said end piece having a portion on one surface thereof including a second polymer having a second softening temperature lower than said first softening temperature,
    said first and second polymers forming a releasable surface connection when said second polymer on one of said end pieces is heated to said second softening temperature and pressed against any location on one of said elongated strips of tape.

* * * * *